United States Patent Office 2,926,729
Patented Mar. 1, 1960

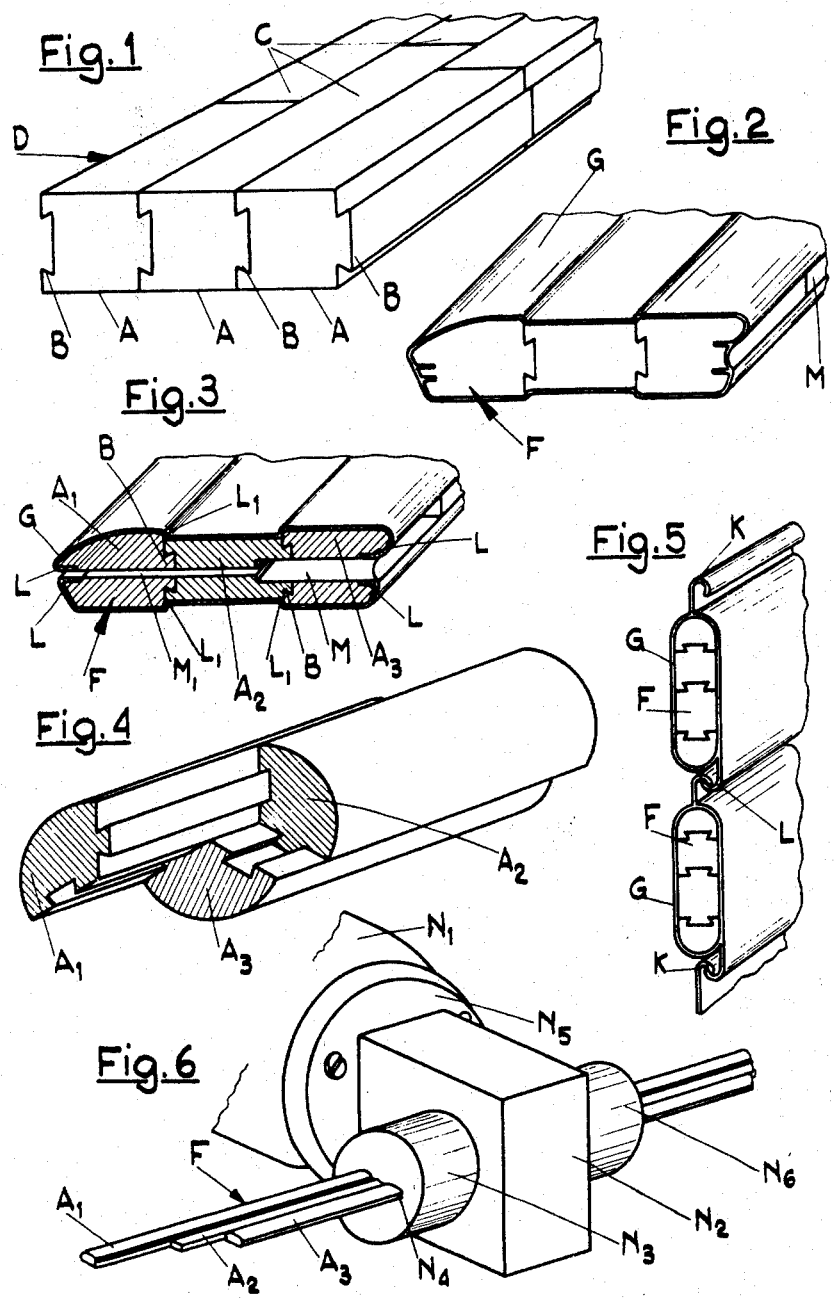

2,926,729
PROCESS TO EMBODY WOODEN LATHS WITH COATING OF PLASTIC MATERIAL

Luigi Zanini, San Dona di Piave, Italy

Application September 25, 1956, Serial No. 611,839

Claims priority, application Italy April 7, 1956

1 Claim. (Cl. 160—236)

This invention relates to a process to embody laths, formed of a core of wood and supplied with a coating of plastic material.

With special, but not exclusive reference to the Venetian blinds or the like with wooden laths, the manufacturing of these laths causes a very great number of rejects, since the laths have to be of one piece only and without knots, crevices or the like. Therefore, the manufacturing of wooden laths for Venetian blinds usually gives occasion to considerable losses and rejects.

The invention proposes to employ strips of wood of any lengths to embody laths of any desired length, making use, should it occur, of the rejects which result from the wood working and which were heretofore unused, in order to obtain a coated profile piece of an indefinite length, from which may be obtained, the laths of the length as desired.

The feature of the process characterizing this invention is the fact to make in the core of the lath grooves or the like, within which the plastic material forming the coating, for at least part of said core, enters under pressure and is therein bounded and anchored.

According to the invention, the wooden elements or bands forming the core of the lath are connected and interlocked and then the elements are shaped, coated with a plastic material, and then from the continuous element the laths of the length desired are cut off.

In order to secure the plastic coating of the core and at the same time to tighten in condition of coaction the various strips forming the core itself, core grooves or the like are made in strips, within which the plastic material, entering under pressure, is anchored therein, thus bonding the strips together.

Advantageously, at least part of the grooves are made substantially in correspondence with the junctions between the various elements forming the lath, so that the plastic material, wedging within said slots, may permit to embody a system of resilient co-action, maintained in such state by the plastic coating.

The lath embodied according to the process which has been above specified, is characterized by a core, formed of wooden bands, suitably connected between them, which core is at least in part arranged and held in place by a sheath or casting of suitable material coating.

Advantageously, the coating sheath is applied to the wooden core with a certain strength, in order to co-actively hold up said core, and in particular, the wooden bands forming the core itself, so as to secure the structure and the monolithic quality of the lath.

The invention also relates to a device to carry out the said process, permitting the continuous coating of the laths with plastic material.

The invention will now be explained by the following description, referring to the accompanying drawing, the last one illustrating, in an exemplifying way, some forms of embodiment of the lath according to the invention.

In the drawing:

Fig. 1 shows a perspective view of a composite lath blank, obtained by means of the union of elementary wooden strips, and from which composite lath blanks are later obtained the laths for Venetian blinds.

Fig. 2 is a perspective view of a lath obtained from the composite lath blank, according to Fig. 1.

Fig. 3 is a section, made in correspondence with one of the openings for the passage of the coupling elements for the various laths.

Fig. 4 is a perspective view of a lath, shaped as stick.

Fig. 5 shows as a perspective view a section of Venetian blind, in which the individual laths are interconnected.

Fig. 6 is a perspective view of the device for coating the laths with a thermoplastic material.

With reference to Fig. 1, to embody the lath as illustrated, one proceeds in the following manner. Wooden strips even rejects or discards from other working are selected so as to remove the more considerable flaws and then submitted to a calibration machining.

Precisely, the elementary strips A are supplied, on one or two of their opposed longitudinal faces, with conjugated or dovetailed recesses B, in order to obtain interlocking connections.

The strips so obtained, the length of which may be limited, too, as compared with the finished lath, are connected between them, paying attention to the fact that the junctions C between the various strips are staggered.

Thus one embodies a composite lath blank D, the single elements A of which are formed of wooden strips, without flaws, as for instance cracks, fissures and so forth.

Strips A are shaped in a plain and quick way by means of a suitable machine, permitting, besides the formation of the tongues and recesses B, the simultaneous calibration of said strips, too, so as to obtain, easily and quickly, blanks D.

Blanks D obtained are then submitted to a shaping, in order to obtain laths F with the outline as desired. Or in an advantageous way, set of strips are embodied (in the case illustrated in Figs. 2 and 3 said strips are three), each of which is first shaped with the due profile, in order to obtain shaped laths which are coupled between them in continuity to embody core F. In the case of Figs. 2 and 3, the three elements of the set are stated as $A_1$, $A_2$ and $A_3$, and said set is formed of a certain number of shaped strips which are interlocked.

This solution permits, as it will be said later on, the quick and rational manufacturing of laths F of an endless length, being sufficient to connect in succession elementary strips $A_1$, $A_2$ and $A_3$ with lath obtained F.

In lath F so obtained will be made then longitudinal, or transverse grooves, for the objects which now will be said.

Advantageously, these grooves may be made in the complete lath F, before coating said lath with sheath G, for instance by means of tools, to be used before the entrance of the lath into the coating device, which will be described later on.

Precisely, as illustrated in Fig. 3, pairs of longitudinal grooves L are foreseen, made in correspondence with the ends of the lath. The reciprocal distance of each groove from the one conjugated is made so as to admit the embodiment between said grooves of the usual openings M—$M_1$, for the passage of the linking members of the laths.

Furthermore, in the wooden lath or core F are made other longitudinal fissures $L_1$, foreseen in correspondence or in proximity of the engaging surfaces between the various sequences of elementary bands $A_1$, $A_2$ and $A_3$. These grooves may be designed under a square, so as to guarantee ulteriorly the anchoring of sheath G or coating.

Core F so obtained is then supplied with coating G. According to this invention, this coating is formed of plastic material, which is applied to lath F by means of extrusion.

The device, applying this coating to laths F, is formed (see Fig. 6) of a worm conveyor, rotating in a pertinent cylinder $N_1$, to convey and compress the plastic material towards an extrusion head $N_2$, supplied with suitable heating means. Said head presents then, in correspondence with its transverse ends, a guiding plate $N_3$, presenting an opening $N_4$, shaped substantially as the transverse section of the lath to be coated.

Head $N_2$ is hollow inside and connected by means of suitable couplings with the outlet opening $N_5$ of worm conveyor $N_1$. The core part of head $N_2$ is closed by a drawing die $N_6$, which presents a profile, reproducing the final profile and contours of the lath. The consequence is that core F is introduced, through suitable forwarding rollers, with regularity and continuity, into the extrusion head $N_2$, where said core is supplied with coating G.

The plastic and fluid material, present under pressure in head $N_2$, is made adherent to all the outline of said core, and in correspondence with grooves L and $L_1$, such plastic material is introduced by force, and therein anchored.

The consequence is that such fluid material, introduced in said grooves, specially in those $L_1$, actuates in the elementary bands A stresses, which are opposed to those actuated in core F by coating or sheath G. Then, when core F, coming out coated from drawing plate $N_6$, and, as the sheath is gradually cooling, said coating is subject to a condition of co-action, rendering monolithic the structure obtained or lath, and of such a capacity to be able to efficaciously resist to the mechanic stresses.

This condition of a monolithic quality of the lath is maintained even after effecting in said lath openings M for the passage of the linking elements. On the contrary, one will notice that the coating sheath G remains intimately adherent with core F, even if openings M—$M_1$ present a certain dimension, since such openings, although discontinuing partially the peripheric continuity of coating G, prevent this last one to get off the core, thanks to the provision of the pairs of grooves L, in which the plastic material has wedged and therein have set, which grooves may be inclined, as compared with the planes of the lath.

Furthermore, the lath so obtained may present the aesthetic features as wanted, since the coating material may be selected of the colour as desired. Besides, the junctions between the various elementary laths A, specially the longitudinal ones, may be easily disguised, foreseeing in correspondence with such junctions some rabbets, the side ends of which coincide with the junction surface, as shown in Fig. 3.

From drawing plate $N_6$, a continuously coated lath of indefinite length is drawn, since its core F is formed of elementary bands $A_1$, $A_2$ and $A_3$, which are of an indeterminate length. From this lath, then, may be obtained, by means of a simple cutting operation, the laths of the length as desired, which are afterwards submitted to the usual completing and finishing operations; in particular, such laths are supplied in the usual way with openings M, $M_1$.

The conception as it has been now explained and pertinent to the possibility of uniting and coating wooden bands in order to obtain the laths characteristic of the invention, allows to embody laths provided with members for their mutual hinged connection, for instance as required in case of laths for Venetian blinds. As shown in Fig. 5, sheaths G of each lath $F_1$ present at their ends ribs K—L, to be conjugated between them and forming the members for the mutual connection of the laths.

Obviously, these ribs may be more or less shaped, in order to embody laths, to be suitably displaced between them and allow the passage of the light through openings.

It appears clear that the lath so obtained, besides presenting a pleasant look, has its own structure, which is resistant to mechanical stresses to which the Venetian blinds are subject. In a particular way, its sheath, being embodied of plastic material, is especially resistant to deleterious atmospheric agents, and therefore renders unnecessary the customary paintings, often required by the usual Venetian blinds.

Furthermore, and always thanks to the coating sheath G, the Venetian blinds so obtained may easily be subject to cleaning by means of a water jet, removing all the deposits, thanks to the smooth surface, presented by the coating sheath.

As shown by Fig. 4, the section of the lath may be a circular one, and the core of such a lath is formed of sets of bands $A_1$, $A_2$ and $A_3$, mutually linked between them by means of dovetail junctions B.

What I claim is:

A lath comprising a plurality of elongated strips, means interlocking said strips in side by side abutting engagement, said strips including a center strip disposed between outer strips, said center strip being of a reduced cross sectional dimension with said outer strips being of greater thickness than said center strip, said center strip having grooves therein adjacent the juncture thereof with the adjacent outer strips, dovetail tongues on said strips, dovetail recesses in said strips oppositely disposed from said tongues, said tongues being interlockingly engaged in the recesses of adjacent strips, and a coating bonded to and entirely covering said strips and extending into said grooves maintaining said strips in interlocked arrangement.

References Cited in the file of this patent
UNITED STATES PATENTS

| | | |
|---|---|---|
| 517,348 | Linderman | Mar. 27, 1894 |
| 1,939,041 | Cherry | Dec. 12, 1933 |
| 2,091,012 | Pratt | Aug. 24, 1937 |
| 2,104,307 | Miller | Jan. 4, 1938 |
| 2,112,861 | Hagen et al. | Apr. 5, 1938 |
| 2,229,225 | Schneider | Jan. 21, 1941 |
| 2,275,975 | McGlone | Mar. 10, 1942 |
| 2,659,932 | McNamee | Nov. 24, 1953 |

FOREIGN PATENTS

| | | |
|---|---|---|
| 464,792 | Italy | July 21, 1951 |